US009509785B2

(12) United States Patent
Unnimadhavan et al.

(10) Patent No.: US 9,509,785 B2
(45) Date of Patent: Nov. 29, 2016

(54) LOCATION APPROXIMATION AND DISCOVERY OF WIRED SERVERS

(71) Applicant: Aruba Networks, Inc., Sunnyvale, CA (US)

(72) Inventors: Sandeep Unnimadhavan, Bangalore (IN); Sudeepto Kumar Roy, Bangalore (IN); Deepak Parasar, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 253 days.

(21) Appl. No.: 14/332,517

(22) Filed: Jul. 16, 2014

(65) Prior Publication Data

US 2016/0021214 A1 Jan. 21, 2016

(51) Int. Cl.
*G06F 15/16* (2006.01)
*H04L 29/08* (2006.01)

(52) U.S. Cl.
CPC ............... *H04L 67/18* (2013.01); *H04L 67/16* (2013.01)

(58) Field of Classification Search
USPC .......................................................... 709/219
See application file for complete search history.

(56) References Cited

U.S. PATENT DOCUMENTS 5,960,424 A * 9/1999 Sadiq ...................... G06F 9/524 707/955
6,078,960 A * 6/2000 Ballard ............... H04L 67/1008 709/203
7,849,198 B2 * 12/2010 Olgaard .................. G06F 15/16 455/420
7,886,023 B1 * 2/2011 Johnson ............. H04L 67/1002 709/219
8,027,678 B2 * 9/2011 Tysowski .............. H04W 48/16 455/435.2
8,469,816 B2 * 6/2013 Liu ................... H04L 29/08576 370/349
8,489,515 B2 * 7/2013 Mathur ............. G06F 17/30867 705/319
8,725,828 B2 * 5/2014 Sathish ................... H04L 67/34 709/216
8,924,560 B2 * 12/2014 Pang ................... G06F 9/45558 709/203
8,982,732 B2 * 3/2015 Balasubarmaniyan .................... H04W 48/20 370/255
2003/0055867 A1 * 3/2003 King ................... H04L 67/2861 709/201
2008/0270398 A1 * 10/2008 Landau .................. G06Q 30/02
2009/0221287 A1 * 9/2009 Balasubramanian . H04W 48/16 455/434
2009/0245176 A1 * 10/2009 Balasubramanian . H04W 48/20 370/328
2013/0166635 A1 * 6/2013 Pyo ......................... H04L 67/42 709/203
2014/0315536 A1 * 10/2014 Chow ..................... H04W 8/18 455/419

* cited by examiner

*Primary Examiner* — Alicia Baturay
(74) *Attorney, Agent, or Firm* — Brooks, Cameron & Huebsch, PLLC

(57) ABSTRACT

The present disclosure discloses a method and network device for providing location approximation and discovery of wired servers in a network. Specifically, a network device can store information indicating that a first client device, with a first set of one or more characteristics, selected a particular shared device from a plurality of shared devices of a first type. The network device then receives, from a second client device, a request for a shared device of the first type. Subsequently, the network device determines that the second client device is associated with the same first set of characteristics as the first client device that selected the particular shared device. Responsive to such determination, the network device presents the particular shared device as an option for selection by the second client device.

20 Claims, 7 Drawing Sheets

LOCATION APPROXIMATION AND DISCOVERY OF WIRED SERVERS

FIELD

The present disclosure relates to device discovery and location approximation in networks. In particular, the present disclosure relates to a method and/or network device for providing location approximation and discovery of wired servers in a network.

BACKGROUND

Wireless digital networks, such as networks operating under the current Institute Electrical and Electronics Engineers (IEEE) 802.11 standards, are spreading in their popularity and availability. Unlike wireless servers, discovery of wired Bonjour® or Digital Living Network Alliance® (DLNA) servers without using any external network component or additional configuration may be challenging.

In a hybrid network that includes both wired servers and wireless servers, an access point can only determine the locations corresponding to the wireless servers. For example, the access point can estimate the location of a shared device (e.g., a wireless server) based on quality associated with a received signal from a wireless server. Moreover, when a shared device is connected to a wireless local area network (WLAN) with location services enabled, the access point can obtain the location of the shared device from a location server.

Nevertheless, the access point typically is unable to determine or display the locations corresponding to the wired servers unless a network administrator has manually configured the locations of the wired servers. When a client device associates with the access point, the access point currently displays wireless servers located nearby the client device as well as all wired servers in the network regardless of their locations.

Thus, in a network with a large number of wired servers, when a client device of a user tries to discover a server, the client device is usually presented with a huge list of wired servers, which is practically difficult for the user to navigate through. Usually, additional and complex configuration is required to identify the locations of wired servers and to prune the server list based on the locations. Hence, a network device, such as an access point and/or a controller, cannot easily approximate the location of a wired server, and thereby refine the wired server list as provided to the user.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to device discovery and location approximation in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to device discovery and location approximation in networks. In particular, the present disclosure relates to a method and/or network device for providing location approximation and discovery of wired servers in a network.

With the solution provided herein, the disclosed network device stores information indicating that a first client device, with a first set of one or more characteristics, selected a particular shared device from a plurality of shared devices of a first type. The network device then receives, from a second client device, a request for a shared device of the first type. Subsequently, the network device determines that the second client device is associated with the same first set of characteristics as the first client device that selected the particular shared device. Responsive to such determination, the network device presents the particular shared device as an option for selection by the second client device.

Network Environment

Figure 1:
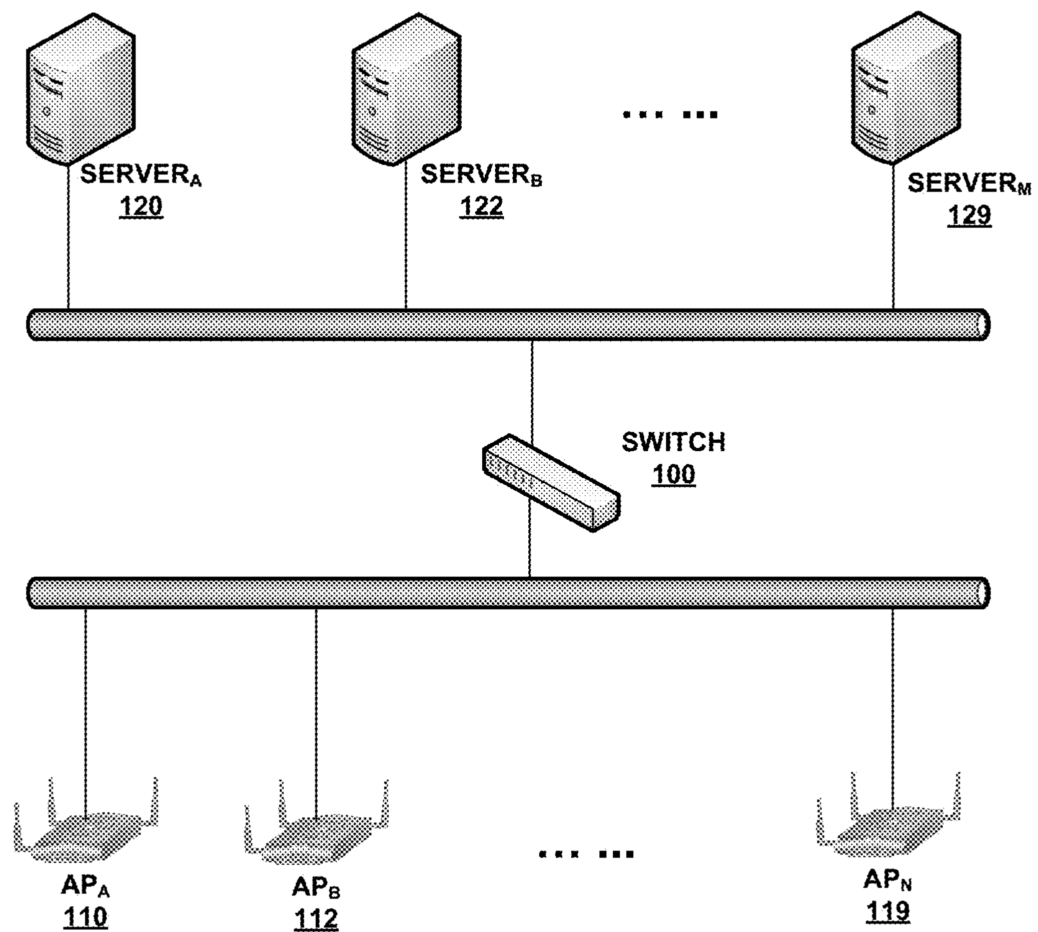
FIG. 1 shows an exemplary network environment according to embodiments of the present disclosure.

FIG. 1 shows an exemplary network environment according to embodiments of the present disclosure. Specifically, FIG. 1 includes at least switch 100, a plurality of wired and/or wireless servers, such as Server$_A$ 120, Server$_B$ 122, . . . , Server$_M$ 129, and a plurality of network devices, such as AP$_A$ 110, AP$_B$ 112, . . . , AP$_N$ 119.

Switch 100 generally refers to a computer networking device that is used to connect devices together on a computer network by performing a form of packet switching. A switch can send a message only to the port connected to the device that needs or requests the message. A switch is a multi-port network bridge that processes and forwards data at the data link layer (layer-2) of the OSI (Open Systems Interconnection) model. A switch may also have additional features, including the ability to route packets, e.g., as layer-3 or multilayer switches.

Servers, such as Server$_A$ 120, Server$_B$ 122, . . . , Server$_M$ 129, generally refer to shared devices that provide one or more services for clients in a network. Such servers may include but are not limited to Bonjour servers and/or Digital Living Network Alliance® (DLNA) servers.

Bonjour is an exemplary implementation of zero-configuration networking (Zeroconf), a group of technologies that includes service discovery, address assignment, and hostname resolution. Bonjour locates devices such as printers, other computers, and the services that those devices offer on a local network using multicast Domain Name System (mDNS) service records.

The DLNA is responsible for defining interoperability guidelines to enable sharing of digital media between multimedia devices. These guidelines specify a set of restricted ways of using existing standards to achieve interoperability and include almost no free audio formats and only the most common (free or otherwise) video formats, meaning that DLNA servers generally have to support transcoding in order to produce a useful service. DLNA uses Universal Plug and Play (UPnP) for media management, discovery and control. UPnP defines the type of device that DLNA supports ("server", "renderer", "controller") and the mechanisms for accessing media over a network. The DLNA guidelines then apply a layer of restrictions over the types of media file format, encodings and resolutions that a device must support.

Access points, such as $AP_A$ 110, $AP_B$ 112, . . . , $AP_N$ 119, generally refer to a wireless network device that allows wireless client devices to connect to a wired network using IEEE 802.11 or related standards. The APs usually connect to a router via a wired network, but can also be an integral component of the router itself. The wireless access points can be managed by a network controller (not shown), which handles automatic adjustments to radio frequency power, wireless channels, wireless authentication, and/or security. Furthermore, network controllers can be combined to form a wireless mobility group to allow inter-controller roaming. The controllers can be part of a mobility domain to allow clients access throughout large or regional enterprise facility locations. This saves the clients time and administrators overhead because it can automatically re-associate or re-authenticate.

Although only one switch is shown in FIG. 1, it shall be noted that multiple switches may exist in the network and connected to the plurality of servers and/or access points. As such the plurality of servers may be connecting different switches and belong to the same or different virtual local area networks (VLANs).

Shared Device Discovery

A. Basic Scheme

Figure 2A:
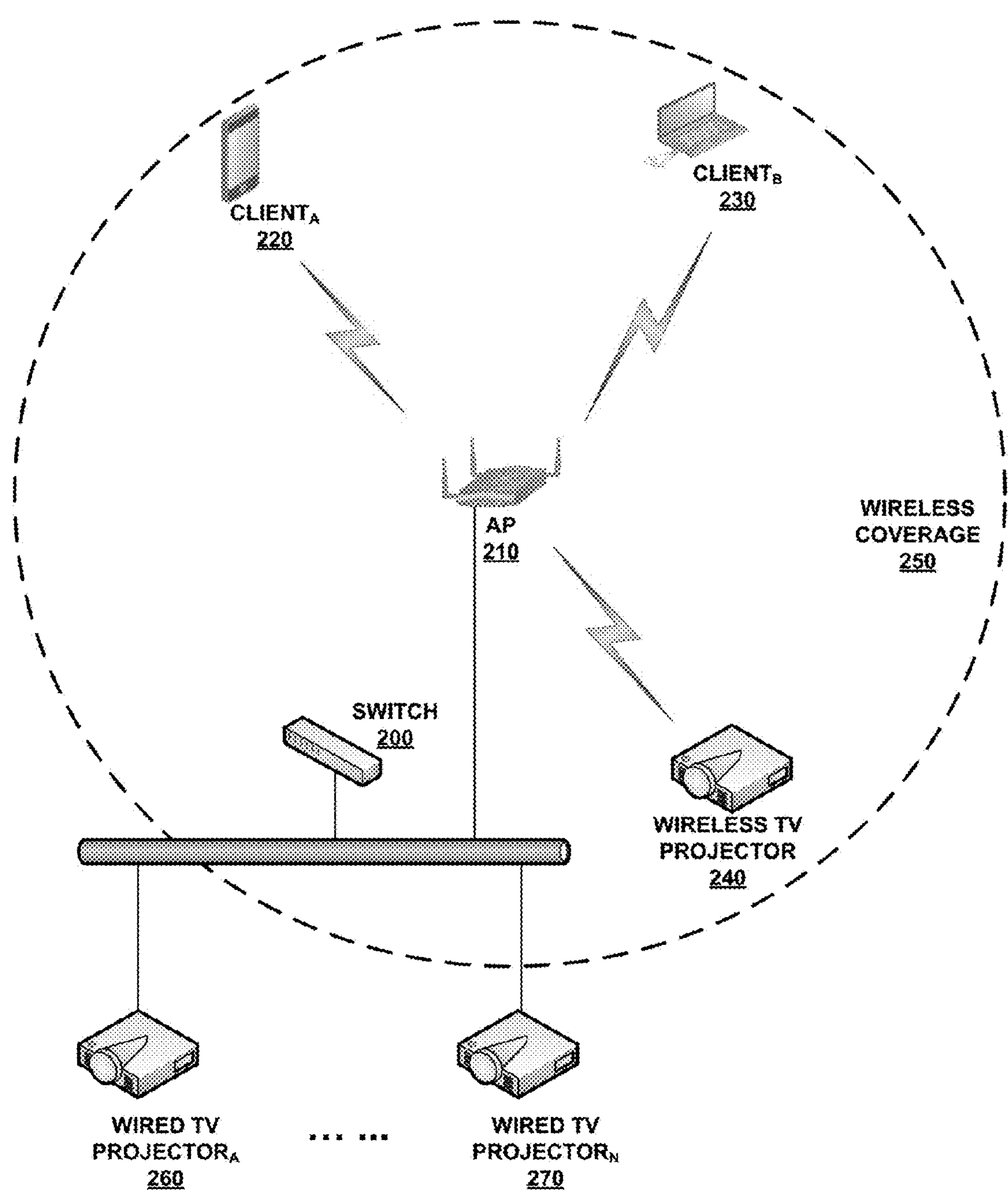
FIG. 2A shows an exemplary network environment according to embodiments of the present disclosure.

FIG. 2A shows an exemplary network environment according to embodiments of the present disclosure. Specifically, FIG. 2A includes at least an access point 210, a switch 200, a plurality of shared devices including wireless and/or wired servers, such as wireless TV projector 240, wired TV $\text{projector}_A$ 260, . . . wired TV $\text{projector}_N$ 270, as well as a plurality of client devices, such as $\text{Client}_A$ 220 and $\text{Client}_B$ 230. In FIG. 2A, the dotted circular area correspond to the wireless coverage area 250 associated with AP 210. Thus, wireless clients and/or servers, such as $\text{Client}_A$ 220, $\text{Client}_B$ 230, wireless TV projector 240, can hear wireless messages transmitted from AP 210 when a client and/or server device is located within wireless coverage 250.

Figure 2B:
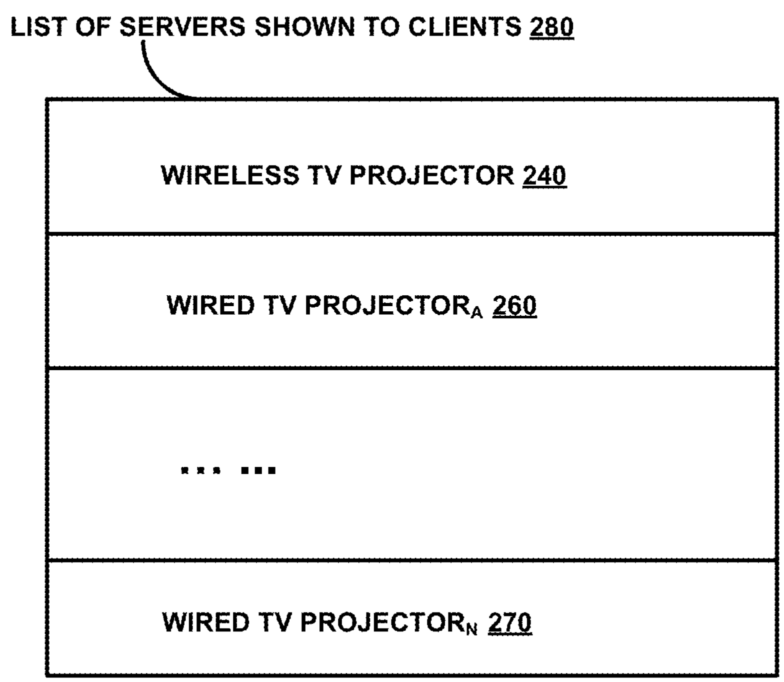
FIG. 2B shows an exemplary displayed list of servers according to embodiments of the present disclosure.

When a client device (such as $\text{Client}_A$ 220 and $\text{Client}_B$ 230) associates with the access point (such as AP 210), the access point displays wireless servers located nearby the client device as well as all wired servers in the network regardless of their locations. Therefore, when a client within AP 210's wireless coverage 250 request for service, e.g., from a TV projector, AP 210 will provide a list of servers as shown in FIG. 2B. In this example, list of servers shown to clients (either $\text{Client}_A$ 220 or $\text{Client}_B$ 230) 280 includes wireless servers located near AP 210 and/or the clients (such as, wireless TV projector 240) as well as all wired servers regardless of locations (such as, wired TV $\text{projector}_A$ 260, . . . , wired TV $\text{projector}_N$ 270).

Thus, in a network with a large number of wired servers, when a client device of a user tries to discover services offered by shared devices, the list of servers shown to clients 280 can grow very large, and thereby making the list difficult to navigate through.

B. Priority Servers

Figure 3:
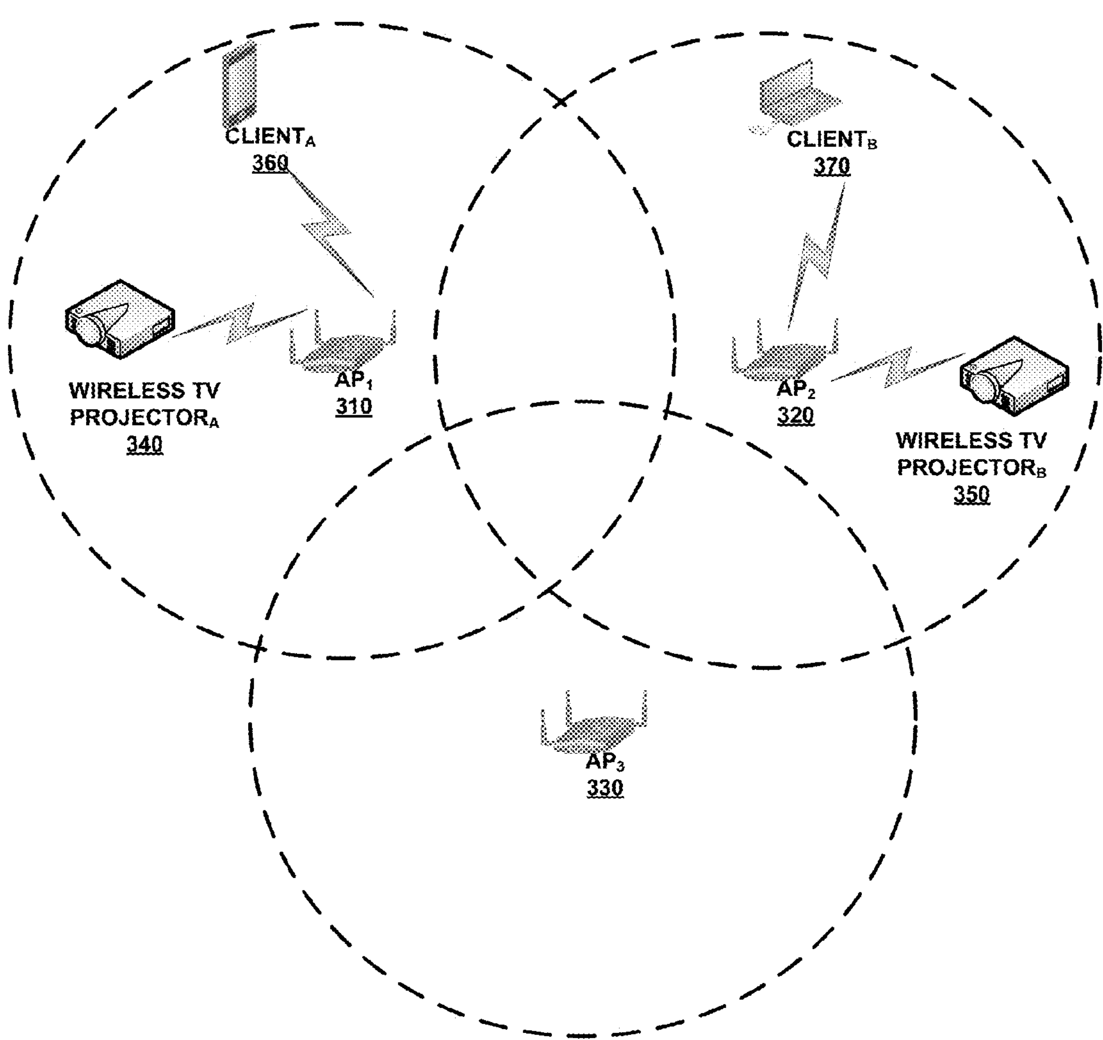
FIG. 3 shows an exemplary network environment according to embodiments of the present disclosure.

FIG. 3 illustrates an exemplary network environment according to embodiments of the present disclosure. FIG. 3 includes at least three APs located within the same WLAN, e.g., $AP_1$ 310, $AP_2$ 320, and $AP_3$ 330. A number of client devices are associated with each AP. For example, $\text{Client}_A$ 360 is connected to $AP_1$ 310, and $\text{Client}_B$ 370 is connected to $AP_2$ 320.

Furthermore, each AP is connected to a number of shared devices. For example, wireless TV $\text{projector}_A$ 340 is connected to $AP_1$ 310 through a wireless link. Similarly, wireless TV $\text{projector}_B$ 350 is connected to $AP_2$ 320 through a wireless link. Note that, the shared devices alternatively can be connected to the APs through wired connections.

According to embodiments of the present disclosure, each client device can discover services provided by the number of shared devices. For example, a shared device can periodically broadcast availability of its service in the network. Any client device that is located within the coverage range to receive such wireless broadcast messages will be able to discover the service. When the shared device is connected through wired interface with the network, an AP can respond to a client device's discovery request with the availability of the shared device.

Subsequently, a client device can select a shared device to consume the services upon discovery of such services. For example, $\text{Client}_A$ 360 may discover that wireless TV $\text{projector}_A$ 340 and wired TV $\text{projector}_A$ to wired TV $\text{projector}_N$ (not shown) are available for a presentation at a meeting held at a particular conference room. Particularly, only wireless TV $\text{projector}_A$ 340 is located within the conference room. Thus, ClientA 360 may elect to connect to wireless TV $\text{projector}_A$ 340 for the meeting presentation.

ClientA 360's connection request is transmitted to wireless TV $\text{projector}_A$ 340 via AP1 310. Therefore, AP1 310 can keep a record of such elections made by various client devices over a period of time, as well as the location of the client devices at the time. AP1 310 can then analyze the records to observe a pattern of shared device usage. For example, AP1 310 may determine that 9 out of 10 client devices, when located in an area corresponding to the conference room, select to connect to wireless TV $\text{projector}_A$ 340. By contrast, 1 out of 10 client devices, when located in the same area, select to connect to wireless TV $\text{projector}_B$ 350. Then, AP1 310 can select one or more priority servers based on the observed pattern of shared device usage. In this example, wireless TV $\text{projector}_A$ 340 will selected as a priority server by AP1 310.

Similarly, $AP_2$ 320 can follow the same logic to select $AP_2$'s priority servers based on shared device usage patterns observed from client devices connected to $AP_2$ 320. Assuming that $AP_2$ 320 detects that 9 out of 10 associated client devices select to connect to wireless TV $\text{projector}_B$ 350. By contrast, only 1 out of 10 associated client devices select to connect to wireless TV $\text{projector}_A$ 340. Thus, $AP_2$ 320 will select wireless TV $\text{projector}_b$ 350 as a priority server.

Note that, the list of priority servers can be different at different APs in the network. Also, the list can be dynamically modified based on changes observed in the shared device usage pattern. For example, if a first TV projector has a burned lamp and becomes unusable, client devices in the conference room will shift to use a second TV projector. Accordingly, AP1 310 will detect such usage shift because the total number of client devices connecting to the second TV projector has exceeded a predetermined threshold value. Thus, AP1 310 will mark the second TV projector as a priority server even though the second TV projector was a non-priority server previously.

Moreover, when a threshold number of client devices select to connect to a particular wired shared device, the AP can combine such usage pattern with the radio frequency neighborhood information to infer the approximate location of the wired shared device. For example, based on the signal strength associated with the signals received from $Client_A$ 360, $Client_C$ (not shown), and $Client_D$ (not shown). $AP_1$ 310 can determine the location of each of the three client devices. Because each of the three client devices chooses the same wired shared device, $AP_1$ 310 can infer that wired shared device must be located at a location close to all three client devices. Therefore, $AP_1$ 310 can estimate the approximate location of the wired shared device based on the locations of the client devices that has selected to consume services offered by the wired shared device.

In addition, the estimated locations of the wired shared devices can be used to rank the priority servers. For example, when $AP_1$ 310 receives a subsequent Bonjour® or DLNA® query for services from $Client_A$ 360, $AP_1$ 310 can determine the location of $Client_A$ 360. When multiple priority servers are identified by $AP_1$ 310, $AP_1$ 310 will respond to $Client_A$ 360's query with the shared device that is located closest to $Client_A$ 360's current location.

Further, the list of priority servers at each AP can be shared with other APs in the network. For example, in FIG. 3, $AP_3$ 330 has no prior usage data of any shared devices, and therefore no derived list of priority servers exists at $AP_3$ 330. Nevertheless, $AP_3$ 330 can obtain the list of priority servers from its neighboring APs in the network, e.g., $AP_1$ 310 and $AP_2$ 320. In some embodiments, $AP_3$ 330 includes, in its own list of priority servers, the priority servers listed in its neighboring APs' lists of priority servers. In the example illustrated in FIG. 3, $AP_3$ 330 will include wireless TV $projector_A$ 340 (from $AP_1$ 310's list of priority servers) and wireless TV $projector_A$ 350 (from $AP_2$ 320's list of priority servers).

Figure 4:
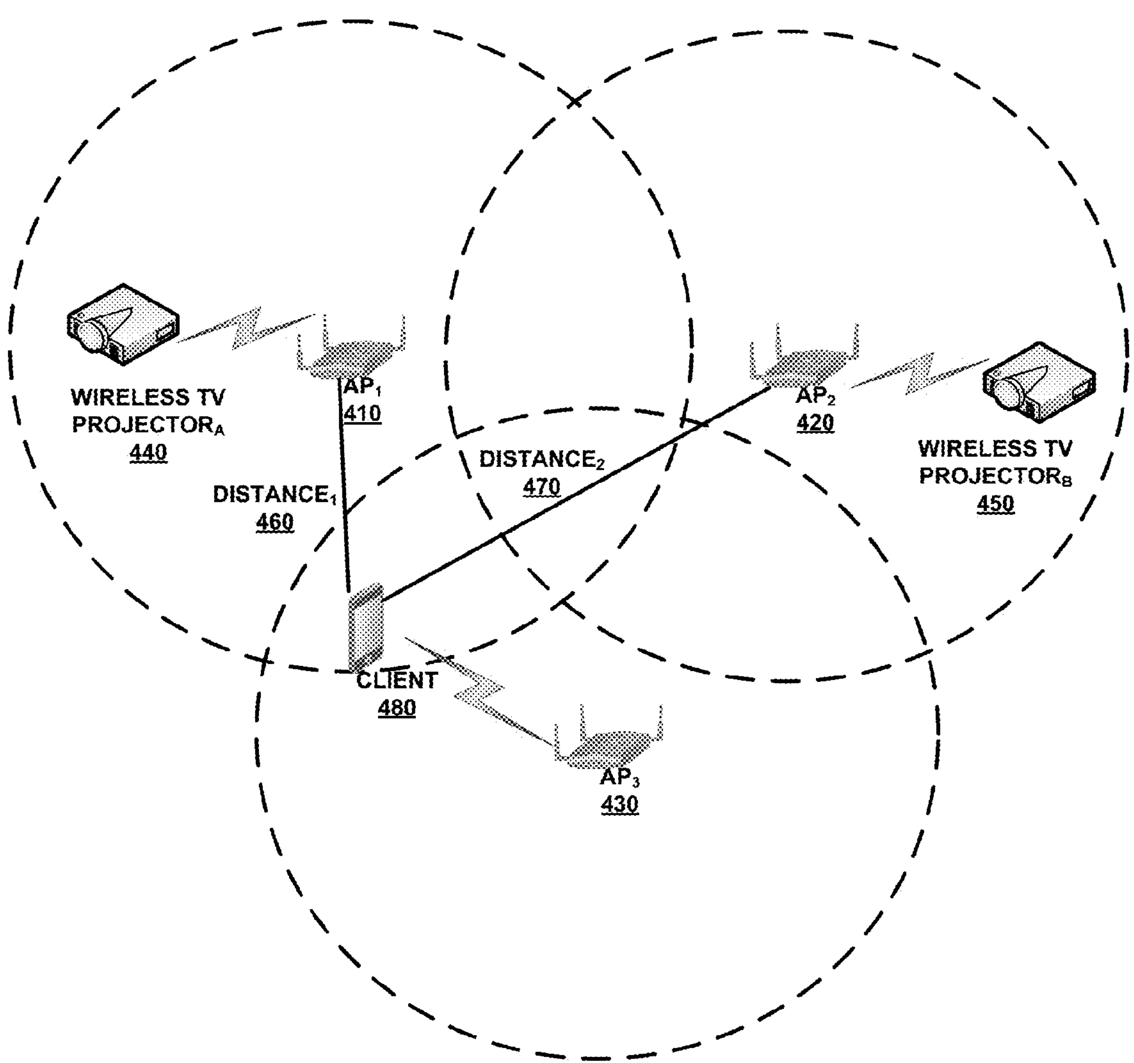
FIG. 4 shows an exemplary network environment according to embodiments of the present disclosure.

FIG. 4 illustrates an exemplary network environment with an enhanced priority server selection mechanism according to embodiments of the present disclosure. Specifically, FIG. 4 includes at least three APs located within the same network, e.g., $AP_1$ 410, $AP_2$ 420, and $AP_3$ 430. A number of client devices are associated with each AP. Furthermore, each AP is connected to a number of shared devices. For example, wireless TV $projector_A$ 440 is connected to $AP_1$ 410 through a wireless link. Similarly, wireless TV $projector_B$ 450 is connected to $AP_2$ 420 through a wireless link. Note that, the shared devices alternatively can be connected to the APs through wired connections. Each client device can discover services provided by a number of shared devices, and select a shared device to consume the services upon discovery of such services. Based on observed pattern of shared device usage by its associated client devices, each AP can select one or more priority servers to include in its list of priority servers. For illustration purposes only, assuming that $AP_1$ 410 select wireless TV $projector_A$ 440 in its list of priority servers; and that $AP_2$ 420 select wireless TV $projector_B$ 450. The APs can share their list of priority servers.

In the example illustrated in FIG. 4, client device 480 is associated with $AP_3$ 430 and initiates a request for TV projector services. Assuming that $AP_3$ 430 has no associated prior usage data for any shared devices, e.g. TV projectors. Thus, $AP_3$ 430 will obtain the lists of priority servers shared from its neighboring APs, such as $AP_1$ 410 and $AP_2$ 420. Note that, in this example, the list of priority servers shared from $AP_1$ 410 includes wireless TV $projector_A$ 440; and, the list of priority servers shared from $AP_2$ 420 includes wireless TV $projector_B$ 450. AP3 430 can then derive its own list of priority servers by combining the two lists shared from its neighboring APs. Also, $AP_3$ 430 can rank the priority servers in the combined list by their respective session information, which can be included as a part of the shared list of priority servers. For example, the shared list of priority servers may show that wireless TV $projector_A$ 440 has been used by client devices of $AP_1$ 410 during 10 prior sessions, whereas wireless TV $projector_B$ 450 has been used by client devices of $AP_2$ 420 during 5 prior sessions. Therefore, in the combined list of priority servers at $AP_3$ 430, wireless TV $projector_A$ 440 will be ranked higher than wireless TV $projector_B$ 450.

In some embodiments, instead of using the number of sessions, the list can also include a cumulative duration of session time associated with each priority server. For example, the shared list of priority servers may show that wireless TV $projector_A$ 440 has been used by client devices of $AP_1$ 410 for 300 minutes cumulatively, whereas wireless TV $projector_B$ 450 has been used by client devices of $AP_2$ 420 for 500 minutes cumulatively. Therefore, in the combined list of priority servers at $AP_3$ 430, wireless TV $projector_B$ 450 will be ranked higher than wireless TV $projector_A$ 440, because $AP_3$ 430 may assume that the more frequently used TV projectors are the better choices for its associated client devices. Alternatively, depending on configurations by the network administrator, $AP_3$ 430 may rank wireless TV $projector_A$ 440 higher than wireless TV $projector_B$ 450 in its list of priority servers, because $AP_3$ 430 may want to balance the load of the client devices to less frequently used priority servers.

Furthermore, $AP_3$ 430 can determine a physical distance, e.g., $Distance_1$ 460, between client device 480 and $AP_1$ 410, as well as a physical distance, e.g., $Distance_2$ 470, between client device 480 and $AP_2$ 420. In some embodiments, the physical distances can be estimated based on the signal strength level, for example, as measured by a received signal strength indicator (RSSI), received at $AP_1$ 410 and/or $AP_2$ 420 from client device 480.

Next, $AP_3$ 430 will combine the lists of priority servers from both $AP_1$ 410 and/or $AP_2$ 420, and rank the priority servers in the combined list by the session information (such as, session numbers and/or session durations) associated with each priority server reversely weighted by the respective physical distance. For example, assuming that wireless TV $projector_A$ 440 has been used by client devices of $AP_1$ 410 during 10 prior sessions; and, wireless TV $projector_B$ 450 has been used by client devices of $AP_2$ 420 also during 10 prior sessions. Moreover, assuming that $Distance_1$ 460 between client device 480 and $AP_1$ 410 is 5 meters; and, $Distance_2$ 470 between client device 480 and $AP_2$ 420 is 10 meters. Because $Distance_1$ 460 is shorter than $Distance_2$ 470, $AP_3$ 430 will rank TV $projector_A$ 440 higher than TV $projector_B$ 450.

In general, there are two categories of shared devices, i.e., priority servers and non-priority servers. At any given time, a wired shared device will belong to either the list of priority servers or the list of non-priority servers. The list of priority servers generally refers to a list of servers which are frequently used, sorted using the usage and approximate proximity of the wired shared device. The list of non-priority servers generally refers to the rest of the shared devices in the network, which are infrequently used. The lists are sorted by the number of times they were returned in response for a Bonjour® and/or DLNA® query from the most frequently used shared device to the least frequently used shared device. Over a period of time, all relevant shared devices will eventually move into the priority servers list from the non-priority servers list. With more usage data, the priority server list gets iteratively refined. Therefore, future Bonjour® and/or DLNA® queries will result in frequently-used servers being presented to the users in response to clients' discovery query for shared devices/services.

C. Non-Priority Servers

Until the approximate location of a sufficient number of wired servers are identified, the Bonjour® and/or DLNA® queries are answered with a random list of non-priority servers. First, a small time-to-live (TTL) value is used while returning results from the list of non-priority servers in response to a client device's Bonjour/DLNA queries. The TTL value corresponds to a period of time during which a service advertised by a shared device is valid. By using a small TTL value (e.g., 10 seconds), a sufficient period of time is given to the user of the client device to select a shared device. If no such shared device is chosen before the TTL value expires, a new list of non-priority servers with the next set of small TTL values will be presented to the client device requesting for the services.

In some embodiments, the random list is rotated to ensure that client devices randomly see different wired servers. Therefore, even when two distinct client devices initiate two queries for the same service at the same time, the two client devices would each see a different list of non-priority servers. This approach is particularly useful for dense deployment scenarios, such as in a conference room where a large number of client devices attempt to consume the same service. All of the non-priority servers present in the network are randomized in a list of non-priority servers. The list is then partitioned into multiple parts. Each part of the list is randomly sent to a different client device requesting for the same service during the same period of time. In the conference room, because everyone now has a random subset of the non-priority servers, there is a better likelihood that an intended server would show up on more than one client devices. Therefore, a session would be initiated from a user of the more than one client devices to the intended server. When the AP in the conference room detects the session, the AP will move the intended server from the list of non-priority servers to the list of priority servers. As such, for all subsequent queries for the same service, the AP will respond with the intended server from the list of priority servers.

In some embodiments, when a client device roams from an AP to a non-neighboring AP, for example, when the client device moves from the first floor of a building to the second floor of the building, the client device will need to be disassociated with the AP on the first floor and become associated with the AP on the second floor. In such scenarios, when the network detects that the client device is roaming from the first floor to the second floor, the list of priority servers sent to the client device will be replaced by a new list of priority servers corresponding to the second floor of the building. This may be achieved, for example, by the AP on the second floor setting the TTL values of priority servers on the first floor to 0.

In some embodiments, when a non-priority server gets prioritized, for example, due to usage, etc., a proactive update may be sent by the AP and/or a controller to all client devices. Thus, in the above example, after the intended server is included in the list of priority servers (which was an empty list previously), the AP will send an update to all of its existing client devices to notify them of the new list of priority servers. This is done to ensure that the new priority server shows up for all client devices.

Furthermore, in some embodiments, a new server will show up more frequently, and will be moved from the list of non-priority servers to the list of priority servers when the new server gets used by the client devices. This approach ensures that a newly installed shared device will show up sooner after installation in response to incoming Bonjour® and/or DLNA® queries from client devices.

Also, when no usage data are available at an AP, the AP can prioritize servers whose name fully or partially matches access point name. This will work in scenarios where the naming of shared devices and network devices is organized. For example, a network administrator may configure an AP on the third floor of a building to be named tower-a-third-floor-ap-2, and a shared device on the third floor of the building to be named tower-a-third-floor-apple-tv. Based on the partial match between the name of the AP and the name of the shared device, the shared device tower-a-third-floor-apple-tv may be ranked higher in the list of non-priority servers when a client device initiates a query within a corresponding physical area (e.g., third floor of tower A).

In some embodiments, an AP can find the nearest shared device by calculating a round trip time (RTT) interval. For example, the AP and/or a controller would send Bonjour® and/or DLNA® queries to all of the non-priority servers present in the list. The RTT on the response for each server is calculated and used to rank the list of non-priority servers. Specifically, a non-priority server corresponding to a relatively short RTT will be ranked higher in the list of non-priority servers than another non-priority server corresponding to a relatively long RTT.

D. Other Enhancements

Because an AP and/or a controller has the knowledge about the frequently-used shared devices as well as infrequently-used shared devices, the AP and/or controller can then report the usage of the shared devices to the network administrator. With this report, the network administrator can identify a coverage hole or underutilization of shared devices.

Process for Location Approximation and Discovery of Wired Servers

Figure 5:
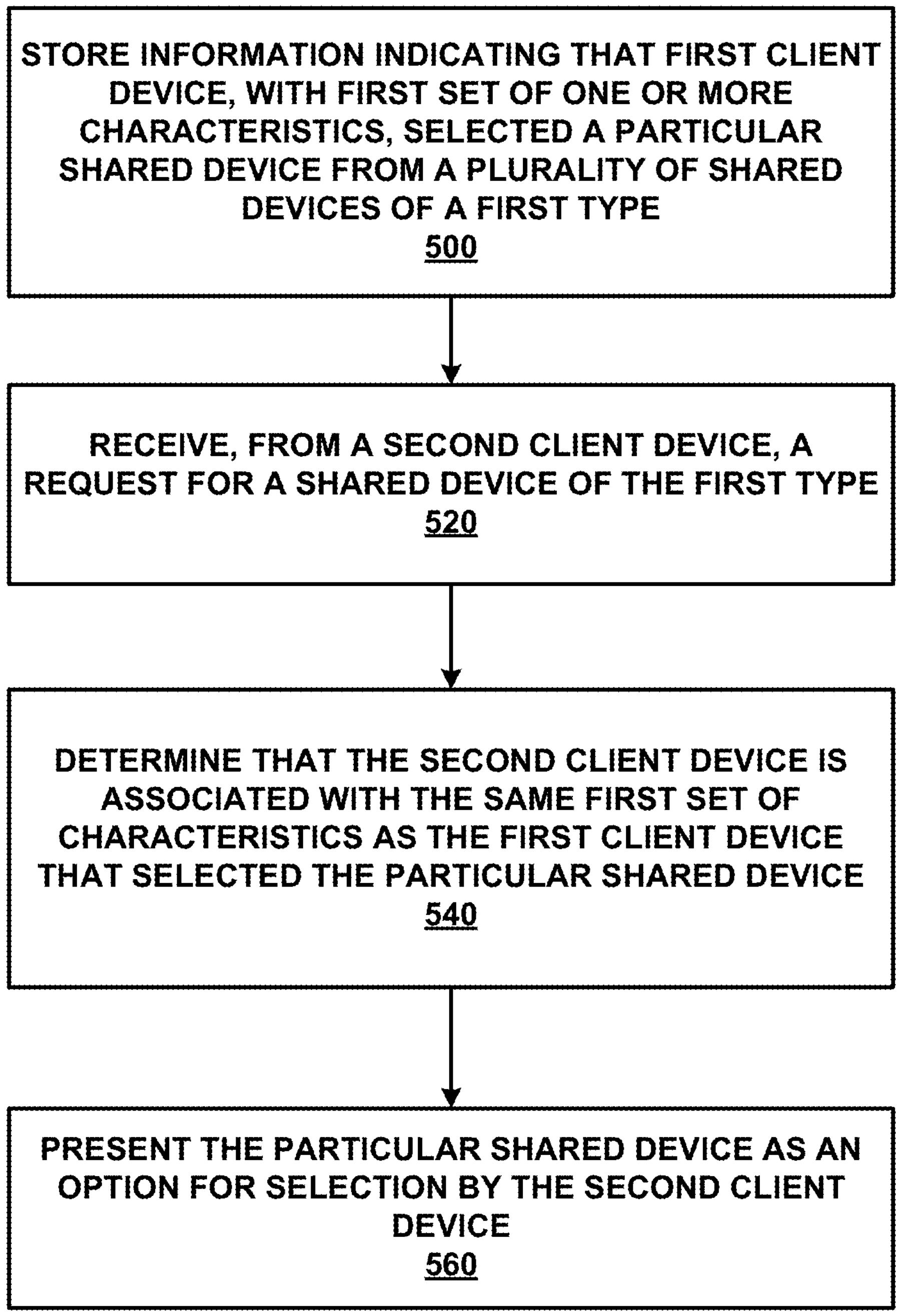
FIG. 5 illustrates an exemplary process for location approximation and discovery of wired servers according to embodiments of the present disclosure.

FIG. 5 illustrates an exemplary process for location approximation and discovery of wired servers according to embodiments of the present disclosure. During operations, a network device stores information indicating that a first client device, with a first set of one or more characteristics, selected a particular shared device from a plurality of shared devices of a first type (operation 500). The network device also receives, from a second client device, a request for a shared device of the first type (operation 520). Further, the network device determines that the second client device is associated with the same first set of characteristics as the first client device that selected the particular shared device (operation 540). Responsive to determining that the second client device is associated with the same first set of characteristics as the first client device, the network device presents the particular shared device as an option for selection by the second client device (operation 560).

In some embodiments, the particular shared device is connected to a network with a wired connection and without a wireless connection.

In some embodiments, the network device presents the particular shared device with a higher priority than another device that was not selected by the first client device. In some embodiments, the network device presents the particular shared device comprises presenting the particular shared device as an option in a list of devices. In particular, a display position of the particular shared device is higher than a display position of another device that was not selected by the first client device. In some embodiments, a display time for the particular shared device is longer than a display time for another device that was not selected by the first client device. Note that, a longer time-to-live (TTL) value may be set for previously selected devices.

In some embodiments, the network device presents devices selected by one or more client devices with the same first set of characteristics without displaying devices not selected by the one or more other client devices.

In some embodiments, while presenting a list of available shared devices of the first type to the second client device, the network device also determines that a second shared device of the first type is selected by one or more other client devices with the same first set of characteristics as the second client device. Furthermore, in response to determining that the second shared device of the first type is selected by the one or more connected to the network, the network device modifies the list of available shared device being presented to the second client device to: (a) add the second shared device to the list of available shared devices, (b) increase a display position of the second shared device in the list of available shared devices, and/or (c) increase a display time of the second device in the list of available shared devices.

In some embodiments, the network device presents the particular shared device as an option for selection by the second client device in response to the network determining that a threshold number of devices, with the same first set of characteristics as the second client device, have selected the particular shared device from the plurality of shared devices.

In some embodiments, the network device presents the particular shared device as an option for selection by the second client device in response to determining that the particular shared device was used by one or more devices, with the same first set of characteristics as the second client device, for a total time period that is greater than a threshold amount of time.

In some embodiments, the network device further determines that the first client device used the particular shared device for a duration of time greater than a threshold amount of time. In addition, the network device stores information indicating that the first client device selected the particular shared device in response to determining that the first client device used the particular shared device for the duration of time greater than the threshold amount of time.

In some embodiments, the first set of one or more characteristics shared by the first client device and the second client device include a geographical location in an environment. For example, the first shared device and the second shared device can be both located within the same conference room, the same estimated location, on the same floor of the same building, etc.

In some embodiments, the first set of one or more characteristics shared by the first client device and the second client device include an access point with which the first client device and the second client device were associated during respective time periods. For example, the first client device and the client device can be both located within the same conference room, the same estimated location, on the same floor of the same building, etc., during the respective time periods.

In some embodiments, the first set of one or more characteristics shared by the first client device and the second client device include association with one of a group of neighboring access points during respective time periods.

In some embodiments, a first access point receives, from a third client device, a second request for a shared device of a second type. The network device determines a first distance from the third client device to a second access point and a second distance from the third client device to a third access point. Then, the network device can present one or more shared devices of the second type that are mapped to either the second access point or the third access point. Note that, the network device may present the one or more shared devices by prioritizing the one or more shared devices based on one or more of: the first distance and the second distance.

In some embodiments, prior to storing the information, the network device receives a request, from the first client device, for devices of the first type. Also, the network device presents a subset of the plurality of shared devices to the first client device while rotating devices in and out of the presented subset of shared devices.

In some embodiments, a display time for each displayed device in the subset of presented devices is dynamically modified based on selection by other client devices with the same first set of characteristics.

In some embodiments, responsive to determining that the first client device roamed from a first access point to a second access point, the network device removes a first set of one or more shared devices from a list of available devices presented to the first client device and adds a second set of one or more shared devices to the list of available devices presented to the first client device. Here, the first set of one or more shared devices are mapped to the first access point; and, the second set of one or more shared devices are mapped to the second access point.

In some embodiments, prior to storing the information, the network device receives a request, by a first access point from the first client device, for devices of the first type. Moreover, the network device selects the particular shared device for presenting to the first client device based on at least a portion of a first identifier associated with the particular shared device matching a portion of a second identifier associated with the first access point.

In some embodiments, prior to storing the information, a first access point receives a request, from the first client device, for devices of the first type, and selects the particular shared device for presenting to the first client device based on at least a Round Trip Time (RTT) to the particular shared device from either the first client device or the first access point.

System for Location Approximation and Discovery of Wired Servers

Figure 6:
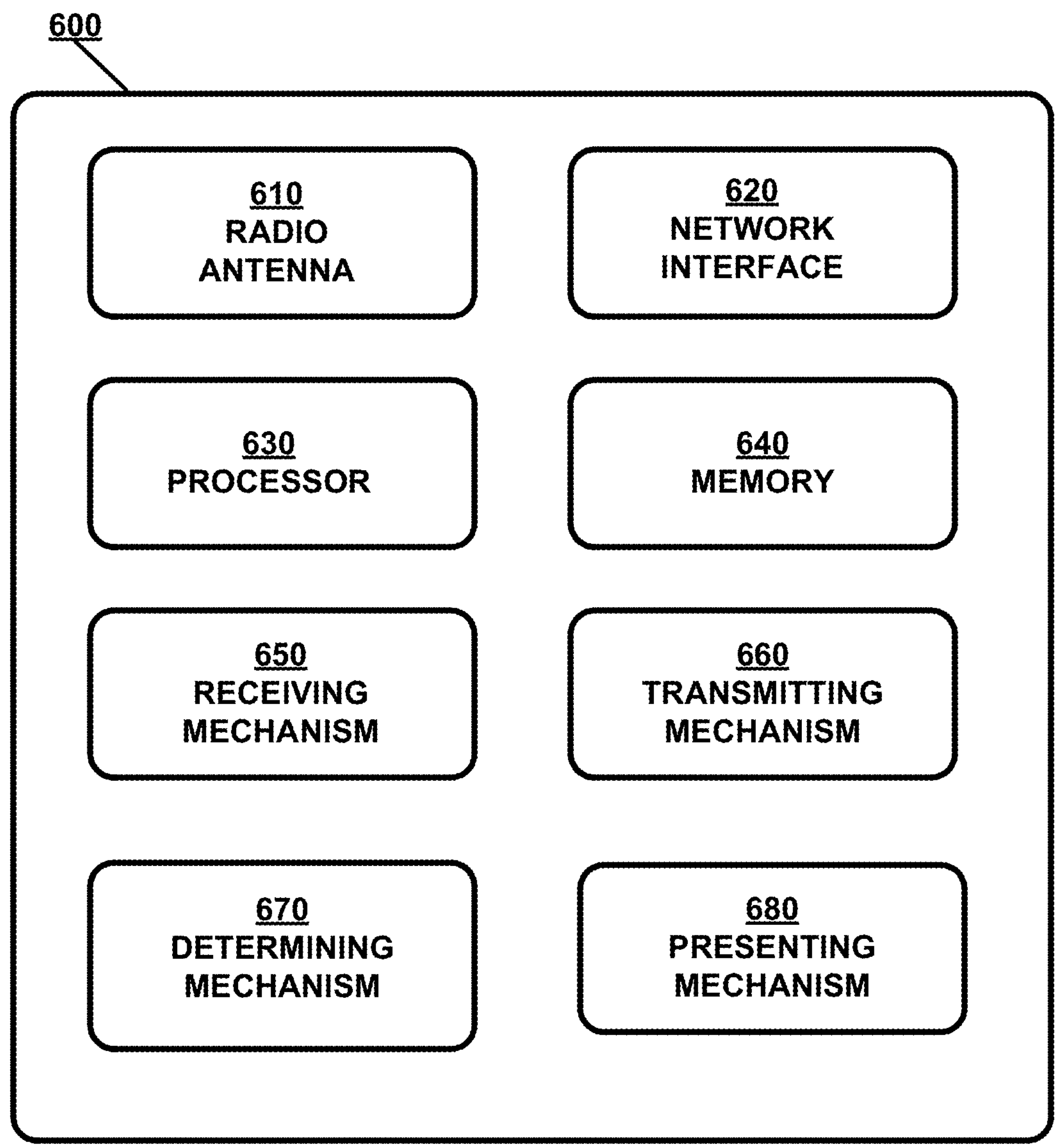
FIG. 6 is a block diagram illustrating an exemplary system for location approximation and discovery of wired servers according to embodiments of the present disclosure.

FIG. 6 is a block diagram illustrating a system for location approximation and discovery of wired servers according to embodiments of the present disclosure.

Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes an receiving mechanism 650, a transmitting mechanism 660, a determining mechanism 670, and a presenting mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

In particular, memory 640 stores information indicating that a first client device, with a first set of one or more characteristics, selected a particular shared device from a plurality of shared devices of a first type. In some embodiments, the first set of one or more characteristics shared by the first client device and the second client device can include a geographical location in an environment. In some embodiments, the first set of one or more characteristics shared by the first client device and the second client device include an access point with which the first client device and the second client device were associated during respective time periods. In some embodiments, the first set of one or more characteristics shared by the first client device and the second client device include association with one of a group of neighboring access points during respective time periods.

Receiving mechanism 650 generally receives one or more network messages via network interface 620 or radio antenna 610 from a wireless client. The received network messages may include, but are not limited to, requests and/or responses, beacon frames, management frames, control path frames, and so on. In particular, receiving mechanism 650 can receive, from a second client device, a request for a shared device of the first type. Furthermore, receiving mechanism 650 of a first access point can receive, from a third client device, a second request for a shared device of a second type. In some embodiments, prior to memory 640 storing the information, receiving mechanism 650 of the first access point receives a request, from the first client device, for devices of the first type.

Transmitting mechanism 660 generally transmits messages, which include, but are not limited to, requests and/or responses, beacon frames, management frames, control path frames, and so on.

Determining mechanism 670 determines that the second client device is associated with the same first set of characteristics as the first client device that selected the particular shared device. Also, determining mechanism 670 determines that the first client device used the particular shared device for a duration of time greater than a threshold amount of time. In some embodiments, determining mechanism 670 determines a first distance from the third client device to a second access point and a second distance from the third client device to a third access point.

The determinations made by determining mechanism 670 can be used to weigh which shared device is to be presented to the client device by presenting mechanism 680. Also, in some embodiments, memory 640 stores the information in response to determining mechanism 670 determines that the first client device used the particular shared device for the duration of time greater than the threshold amount of time.

Presenting mechanism 680 generally presents a shared device as an option for selection by the second client device. Specifically, the particular shared device is connected to a network, including the first client device, with a wired connection and without a wireless connection.

In some embodiments, presenting mechanism 680 presents the the particular shared device with a higher priority than another device that was not selected by the first client device. In some embodiments, presenting mechanism 680 presents the particular shared device as an option in a list of devices. Here, a display position of the particular shared device is higher than a display position of another device that was not selected by the first client device.

In some embodiments, presenting mechanism 680 presents the particular shared device as an option in a list of devices. Here, a display time for the particular shared device is longer than a display time for another device that was not selected by the first client device.

In some embodiments, presenting mechanism 680 presents devices selected by one or more client devices with the same first set of characteristics without displaying devices not selected by the one or more other client devices.

In some embodiments, while presenting mechanism 680 presents a list of available shared devices of the first type to the second client device, determining mechanism 670 determines that a second shared device of the first type is selected by one or more other client devices with the same first set of characteristics as the second client device.

In some embodiments, responsive to determining mechanism 670 determines that the second shared device of the first type is selected by the one or more connected to the network, presenting mechanism 680 modifies the list of available shared device being presented to the second client device to: (a) add the second shared device to the list of available shared devices, (b) increase a display position of the second shared device in the list of available shared devices, and/or (c) increase a display time of the second device in the list of available shared devices.

In some embodiments, presenting mechanism 680 presents the particular shared device as an option for selection by the second client device in response to determining mechanism 670 determining that a threshold number of devices, with the same first set of characteristics as the second client device, have selected the particular shared device from the plurality of shared devices.

In some embodiments, presenting mechanism 680 presents the particular shared device as an option for selection by the second client device in response to determining mechanism 670 determines that the particular shared device was used by one or more devices, with the same first set of characteristics as the second client device, for a total time period that is greater than a threshold amount of time.

In some embodiments, presenting mechanism 680 presents one or more shared devices of the second type that are mapped to either the second access point or the third access point, for example, by prioritizing the one or more shared devices based on the first distance and/or the second distance.

In some embodiments, prior to memory 640 storing the information, presenting mechanism 680 presents a subset of the plurality of shared devices to the first client device while rotating devices in and out of the presented subset of shared devices. In particular, a display time for each displayed device in the subset of presented devices is dynamically modified based on selection by other client devices with the same first set of characteristics.

In some embodiments, responsive to determining mechanism 670 determining that the first client device roamed from a first access point to a second access point, presenting mechanism 680 removes a first set of one or more shared devices from a list of available devices presented to the first client device, and adds a second set of one or more shared devices to the list of available devices presented to the first client device. Here, the first set of one or more shared devices are mapped to the first access point; and, the second set of one or more shared devices are mapped to the second access point.

In some embodiments, prior to memory 640 storing the information, presenting mechanism 680 selects the particular shared device for presenting to the first client device based on at least a portion of a first identifier associated with the particular shared device matching a portion of a second identifier associated with the first access point.

In some embodiments, prior to memory 640 storing the information, presenting mechanism 680 selects the particular shared device for presenting to the first client device based on at least a Round Trip Time (RTT) to the particular shared device from either the first client device or the first access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by at least one device including hardware processors, causes performance of operations comprising:

storing information indicating that a first client device, with a first set of characteristics, selected a particular shared device from a plurality of shared devices of a first type;

receiving, from a second client device, a request for a shared device of the first type;

determining that the second client device is associated with the same first set of characteristics as the first client device that selected the particular shared device;

responsive to the determining operation, presenting the particular shared device as an option for selection by the second client device;

determining that a second shared device of the first type is selected by one or more other client devices with the same first set of characteristics as the second client device; and responsive to determining that the second shared device of the first type is selected by the one or more connected to the network, modifying the list of available shared device being presented to the second client device.

2. The medium of claim 1, wherein the particular shared device is connected to a network, comprising the first client device, with a wired connection and without a wireless connection.

3. The medium of claim 1, wherein the presenting the particular shared device comprises presenting the particular shared device with a higher priority than another device that was not selected by the first client device.

4. The medium of claim 1, wherein presenting the particular shared device comprises presenting the particular shared device as an option in a list of devices, wherein a display position of the particular shared device is higher than a display position of another device that was not selected by the first client device.

5. The medium of claim 1, wherein presenting the particular shared device comprises presenting the particular shared device as an option in a list of devices, wherein a display time for the particular shared device is longer than a display time for another device that was not selected by the first client.

6. The medium of claim 1, wherein the particular shared device comprises presenting devices selected by one or more client devices with the same first set of characteristics without displaying devices not selected by the one or more other client devices.

7. The medium of claim 1, wherein the operations further comprises:

determining that the second shared device of the first type is selected by the one or more other client devices with the same first set of characteristics as the second client device while presenting a list of available shared devices of the first type to the second client device, and wherein the modifying the list of available shared device being presented to the second client device to: (a) add the second shared device to the list of available shared devices, (b) increase a display position of the second shared device in the list of available shared devices, and/or (c) increase a display time of the second device in the list of available shared devices.

8. The medium of claim 1, wherein presenting the particular shared device as an option for selection by the second client device is responsive to determining that a threshold number of devices, with the same first set of characteristics as the second client device, have selected the particular shared device from the plurality of shared devices.

9. The medium of claim 1, wherein presenting the particular shared device as an option for selection by the second client device is responsive to determining that the particular shared device was used by one or more devices, with the same first set of characteristics as the second client device, for a total time period that is greater than a threshold amount of time.

10. The medium of claim 1, wherein the operations further comprise determining that the first client device used the particular shared device for a duration of time greater than a threshold amount of time, and wherein the storing operation is responsive to determining that the first client device used the particular shared device for the duration of time greater than the threshold amount of time.

11. The medium of claim 1, wherein the first set of one or more characteristics shared by the first client device and the second client device include a geographical location in an environment.

12. The medium of claim 1, wherein the first set of one or more characteristics shared by the first client device and the second client device include an access point with which the first client device and the second client device were associated during respective time periods when said operations were performed.

13. The medium of claim 1, wherein the first set of one or more characteristics shared by the first client device and the second client device include association with one group of neighboring access points during respective time periods when said operations were performed.

14. The medium of claim 1, wherein the operations further comprise:

receiving, by a first access point from a third client device, a second request for a shared device of a second type;

determining a first distance from the third client device to a second access point and a second distance from the third client device to a third access point; and presenting one or more shared devices of the second type that are mapped to either the second access point of the third access point, wherein presenting the one or more shared devices comprises prioritizing the one or more shared devices based on one or more of: the first distance and the second distance.

15. The medium of claim 1, wherein the operations further comprise:

prior to storing the information:

receiving a request, from the first client device, for devices of the first type;

presenting a subset of the plurality of shared devices to the first client device while rotating devices in and out of the presented subset of shared devices.

16. The medium of claim 15, wherein a display time for each displayed device in the subset of presented devices is dynamically modified based on selection by other client devices with the same first set of characteristics.

17. The medium of claim 1, wherein the operations further comprise:

responsive to determining that the first client device roamed from a first access point to a second access point:

removing a first set of one or more shared devices form a list of available devices presented to the first client device and adding a second set of one or more shared devices to the list of available devices presented to the first client device, wherein the first set of one or more shared devices are mapped to the first access point, and wherein the second set of one or more shared devices are mapped to the second access point.

18. The medium of claim 1, wherein the operations further comprise:

prior to storing the information:

receiving request, by a first access point from the first client device, for devices of the first type;

selecting the particular shared device for presenting to the first client device based on a t least a portion of a first identified associated with the particular shared device matching apportion of a second identifier associated with the first access point.

19. The medium of claim 1, wherein the operations further comprise:

prior to storing the information:

receiving a request, by a first access point from the first client device, for devices of the first type, selecting the particular shared device for presenting to the first client device based on a least a Round Trip Time (RTT) to the particular shared device from either the first client device or the first access point.

20. A system comprising:

at least one device including a hardware processor;

the system being configured to perform operations comprising:

storing information indicating that a first client device, with a first set of one or more characteristics, selected a particular shared device from a plurality of shared devices of a first type;

receiving, from a second client device, a request for a shared device of the first type;

determining that the second client device is associated with the same first set of characteristics as the first client device that selected the particular shared device;

responsive to determining operation, presenting the particular shared device as an option for selection by the second client device;

receiving, by a first access point from a third client device, a second request for a shared device of a second type;

determining a first distance from the third client device to a second access point and a second distance from the third client device to a third access point; and presenting one or more shared devices of the second type that are mapped to either the second access point or the third access point, wherein presenting the one or more shared devices comprises prioritizing the one or more shared devices based on one or more of: the first distance and the second distance.

* * * * *